United States Patent

Mills

[15] 3,686,791

[45] Aug. 29, 1972

[54] WALLS, SCREENS AND THE LIKE

[72] Inventor: Kenneth Wilson Mills, Bolton, England

[73] Assignee: Vernon & Company (Pulp Products) Limited, Bolton, Lancashire, England

[22] Filed: Oct. 2, 1970

[21] Appl. No.: 77,544

[30] Foreign Application Priority Data

Oct. 20, 1969 Great Britain..........51,285/69

[52] U.S. Cl..............................................47/34.12
[51] Int. Cl. ..............................................A01g 9/02
[58] Field of Search...................47/34, 34.12, 33, 38

[56] References Cited

UNITED STATES PATENTS

| | | | |
|---|---|---|---|
| 3,310,910 | 3/1967 | Titus | 47/33 |
| 2,670,571 | 3/1954 | Waldron | 47/34.12 |
| 2,756,541 | 7/1956 | Berger | 47/34.12 |
| 3,073,061 | 1/1963 | Pearson | 47/34 |
| 3,137,095 | 6/1964 | Pearson | 47/33 |
| 3,252,252 | 5/1966 | Muelberger | 47/38 |

FOREIGN PATENTS OR APPLICATIONS

| | | | |
|---|---|---|---|
| 15,082 | 1901 | Great Britain | 47/34.12 |
| 90,370 | 9/1937 | Sweden | 47/34.12 |

*Primary Examiner*—Robert E. Bagwill
*Attorney*—Linton & Linton

[57] ABSTRACT

The invention provides a constructional unit comprising a plurality of pockets or pots for containing growing media for plants arranged around and extending from a central hole, and formed with means for registering same in alignment with subjacent and superjacent fellow units whereby structures in the form of columns or walls may be erected with pockets extending therefrom for the reception and growing of plants therein.

6 Claims, 11 Drawing Figures

PATENTED AUG 29 1972
3,686,791
SHEET 1 OF 4
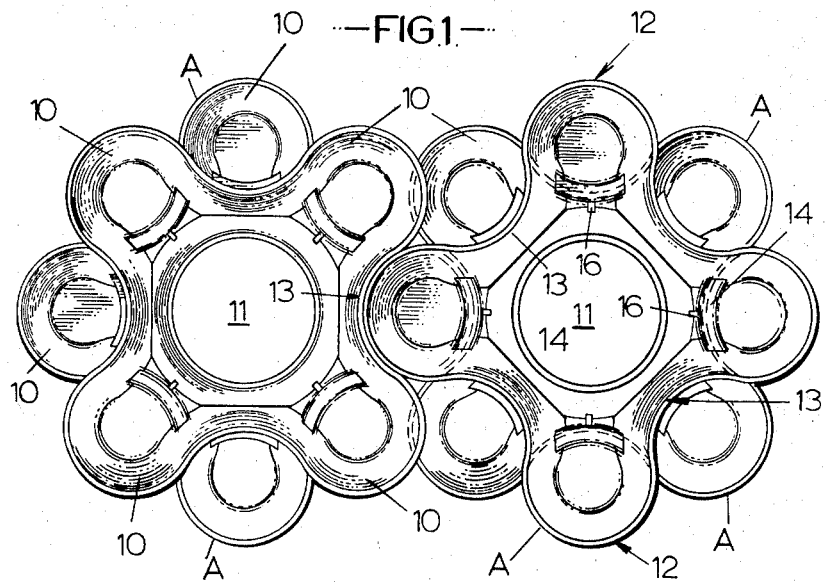
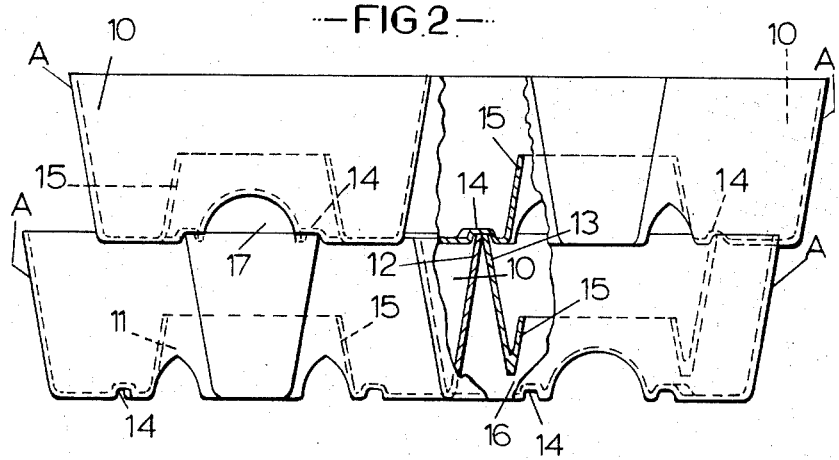
INVENTOR:
KENNETH WILSON MILLS
BY
Linton and Linton
ATTORNEYS PATENTED AUG 29 1972
3,686,791
SHEET 2 OF 4
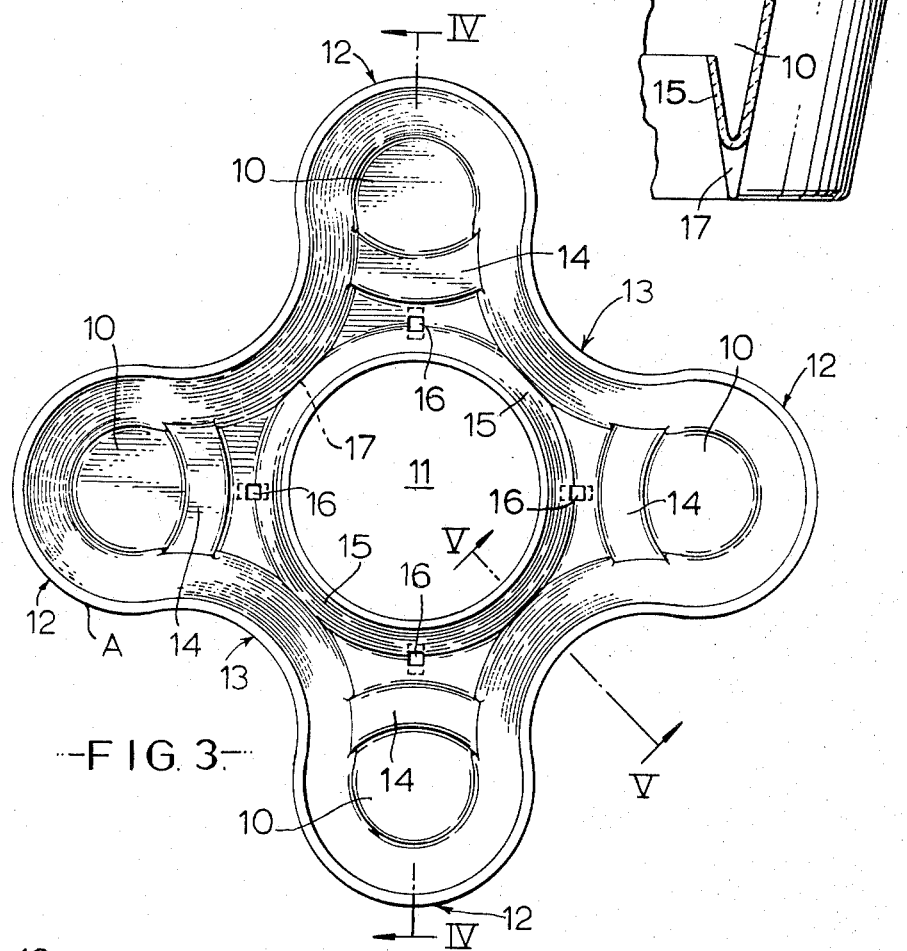
FIG. 5.
FIG. 3.
FIG. 4.
INVENTOR:
KENNETH WILSON MILLS
BY
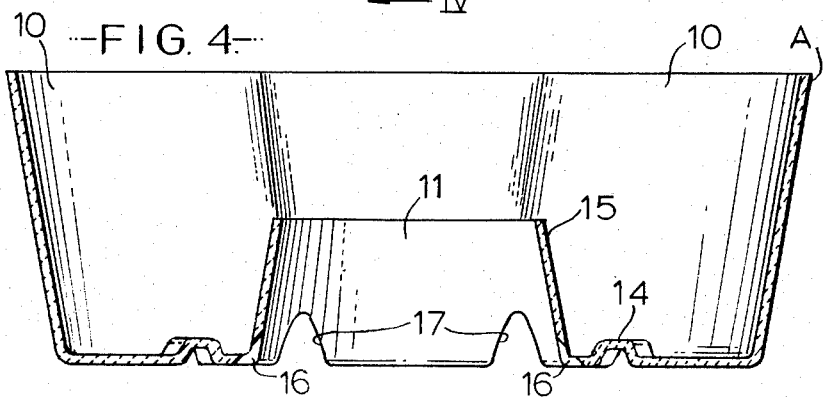
ATTORNEYS PATENTED AUG 29 1972
3,686,791
SHEET 3 OF 4
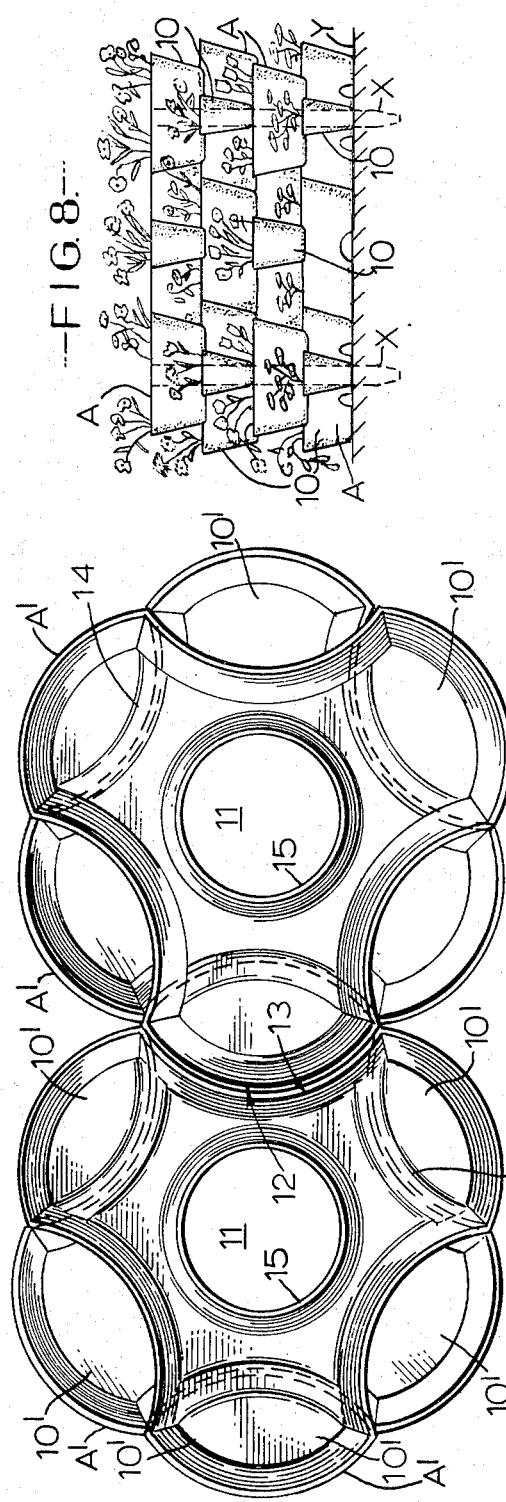
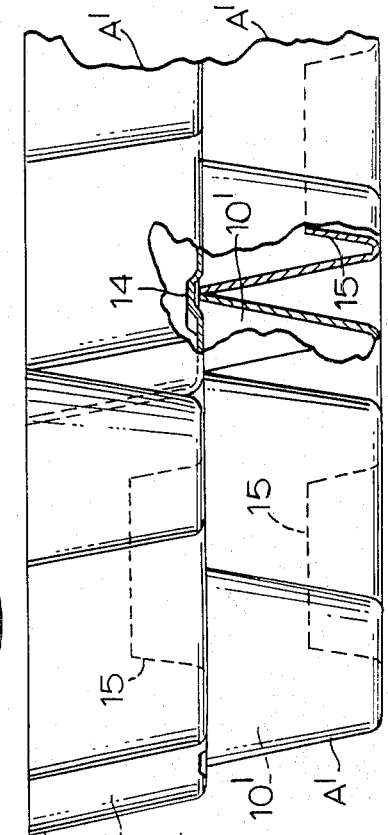
INVENTOR:
KENNETH WILSON MILLS
BY
Linton and Linton
ATTORNEYS

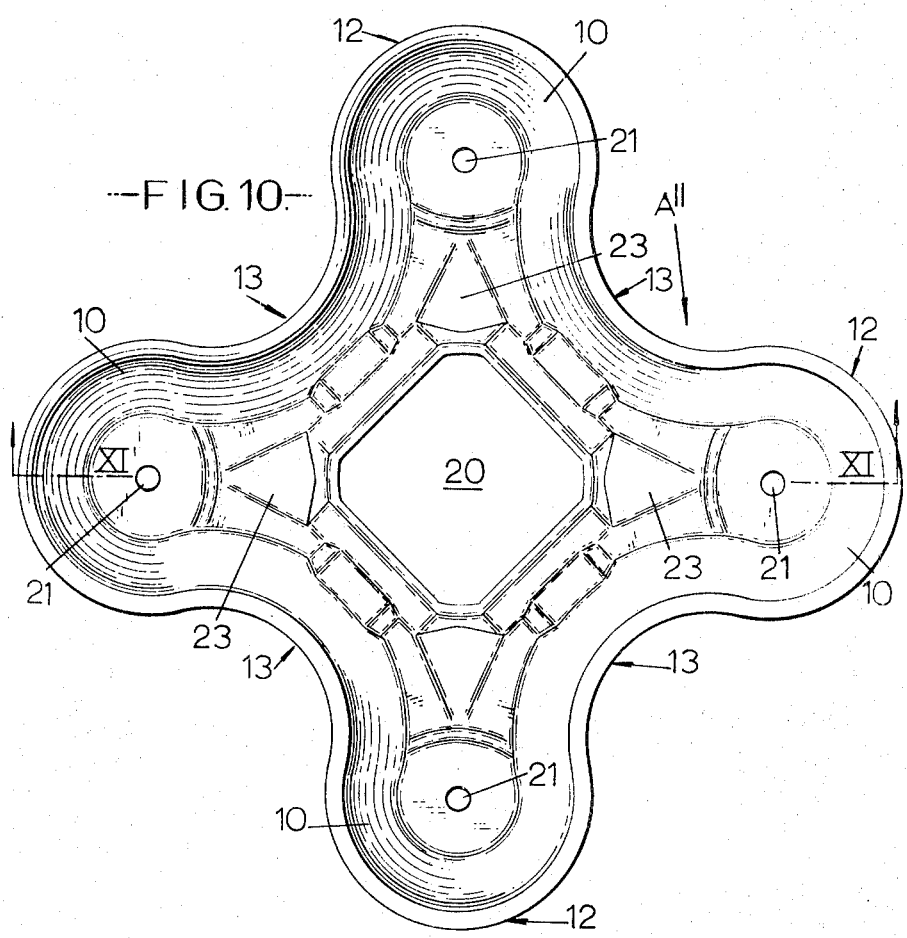
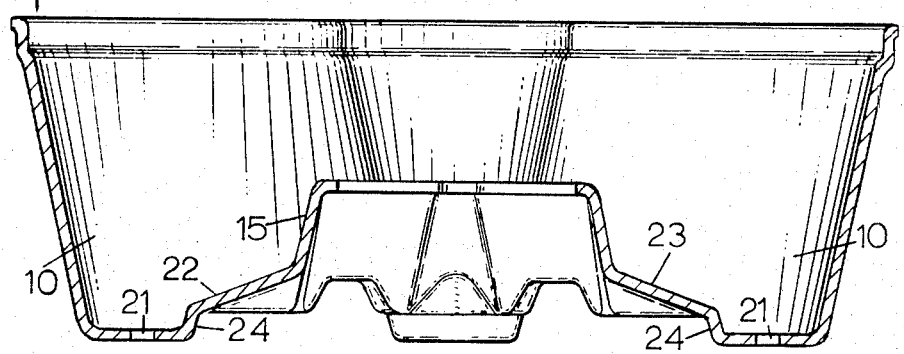

3,686,791

WALLS, SCREENS AND THE LIKE

This invention relates to units for use in the construction of walls, screens and the like and particularly, but not exclusively, walls or screens for gardens and houseyards, such walls or the like having provision for the growing therein of plants.

According to the present invention there is provided a unit for use, in combination with similar units, in the construction of a wall, screen or the like, comprising a plurality of pockets or "pots" and arranged around and extending from a central hole and formed with means for registering same in alignment with subjacent or superjacent fellow units.

The present invention also provides a wall, screen or the like formed from a plurality of units as above set forth arranged in superimposed courses or rows and nested or interlocked together so as to form a stable structure.

Stability may be enhanced by positioning a vertical reinforcing member or upright through the aligned central holes of the units.

For growing plants, the pockets are filled with earth, compost or other suitable plant growing media. For locating artificial plants in the pockets other suitable material may be filled into the pockets, and the term 'growing media' used herein is intended to include such materials.

Particular embodiments of the invention will now be described by way of example with reference to the accompanying drawings in which:

FIG. 1 is a plan view of some of the units assembled together, and

FIG. 2 is a side elevation in part section of the units of FIG. 1.

FIG. 3 is a plan view of one of the units.

FIG. 4 is a sectional view as on line IV—IV of FIG. 3.

FIG. 5 is a fragmentary sectional view on the line V—V of FIG. 3.

FIG. 6 is a plan view of a modified form of units.

FIG. 7 is an elevation partly in section of the units shown in FIG. 6, and

FIG. 8 illustrates a wall or screen in accordance with the present invention in which plants are growing.

FIG. 9 is a perspective view of a tubular member or upright for reinforcing a wall as illustrated in FIG. 8.

FIG. 10 is a plan view of a further alternative form of unit, and

FIG. 11 is a section as on line XI—XI of FIG. 10.

In the various Figures, like characters of reference have been used to denote like parts wherever they occur.

Each unit A (see more particularly FIGS. 3 to 5) is basically a seed pan having a plurality of radially extending pockets 10 arranged about a central hole 11 which is defined by an upwardly extending tapering tube 15. The unit may be considered in plan as resembling a four-pointed star with the tips 12 of the points convexedly radiussed so as to correspond with intervening concave radii 13 separating the pockets 10 which form the points of the star. The pockets 10 are, in this instance, generally circular in shape.

When units A are stacked as shown in FIGS. 1 and 2, the units in part nest inside each other. When so stacked the bottoms of upper units in the stack rest on the top edges of the subjacent units. To facilitate registration of this stacking, four grooves 14 are moulded into the base of each unit, arranged so as to seat upon the concave radii 13. It is therefore possible to build a column of units A with each of said units registered onto and angularly off-set by 45° relatively to the one beneath it, and each unit adding to the height of the column. The central holes 11 of the units are in vertical alignment and provide a hole which extends throughout the height of the column. A reinforcing rod or tube may thus be driven through the column of units into the earth to add structural strength to the construction.

When the pockets 10 of the first unit A, which forms the base of the column, are filled to within a short distance from their top edges with soil or other plant growing media, the central hole 11 with or without reinforcing means may also be filled. Subsequent units A as they are added to the column also are filled and thus when the structure is complete it is possible to plant flowers, trailing plants or fruit plants such as strawberries in the growing media contained in the pockets 10 which radiate from the center of the column.

The central hole of the column of units ensures that the weight of the growing media in the structure is not solely carried by the pockets 10 of the units. It also serves as a main drainage point. To facilitate drainage, slots 16 are formed in each pocket 10 at the point where the tapered tube 15 defining the hole 11 joins the base of the unit.

In FIG. 5 there is illustrated cut-aways 17 formed in the base of the unit A which permit the circulation of air to the central core of growing media filled into the aligned holes 11 to prevent same from going sour.

Plants growing in the pockets 10 of the units A may be watered by the natural catchment of rain. Alternatively, water and/or plant nutrients may be introduced at the top of the central core of growing media so that they drain and by capillary action nourish or water the plants in the pockets 10. Watering by this method may be facilitated by introducing a reinforcing tube, designated X in FIG. 9, provided with small diameter holes X', and which may be filled with sand as construction of a column of units A proceeds. Such a tube X, which may be metal or plastics construction, is driven into the earth Y (FIG. 8) on which the units A are laid. Alternatively, the central core may be filled with gravel or brick dust or sand to provide rapid drainage or transmission of moisture, or with peat or other fibrous substances which will retain moisture.

In an alternative application, a garden wall or screen may be constructed. In this instance units A may be laid on a suitable bed in superposed rows or courses as shown most clearly in FIG. 8, with or without reinforcing means as X.

To lay the first course, a first unit A is placed on the ground at one end of the intended wall construction, and filled or nearly filled with appropriate plant growing media. A second unit is placed in position angularly off-set by 45° to the first unit, whereby the convex male radius on the point 12 of the first unit is accommodated by the concave female radius 13 separating two points 12 in the second unit, thus providing a lateral connection or mating of the two units as shown most clearly in FIGS. 1 and 2. The second unit A is then filled or nearly filled as before. A third unit is laid so that a convex radius 12 registers with the concave radius 13 of the second unit and is then filled. This process is repeated, each unit being mated with its laterally adjacent units, until the first course of units extends for the intended length of the wall. Where reinforcing means as X are used these may be provided in respect of each column of units, or said reinforcing means may be introduced merely at each end, or at selected positions, of the wall.

When a first course of units A has been laid, plants, seeds, seedlings or bulbs may be planted in the pockets 10 which project from the face of the wall at alternate angles of about 90° and 45°. Alternatively, planting may be delayed until the construction of the wall is completed.

A second course may now be laid each unit being superposed on a unit of the first course but off-set relatively thereto by 45°, the grooves 14 moulded into the base of each unit being engaged with the convexedly radiussed top edges 13 of the units beneath in order to register its position. It will be noted, see FIG. 2, that adjacent units of a course of units are locked together against displacement by the engagement of a groove 14 of an upper unit, with the top edges of the adjacent radiussed portions 12 and 13. Additional courses are similarly added until the desired wall height is achieved.

The direction of such a wall may be readily changed at angles of say 90° or 45°.

Constructions using units according to the invention can be erected outdoors, or indoors on paved, wooden or carpeted surfaces providing that where appropriate a drainage tray or pan is first laid on the surface.

Units according to the invention may be manufactured as by moulding from cellulose fibers impregnated with a suitable plastics material, e.g. phenol formaldehyde. Such material is strong, but light and porous and eminently suitable for the propogation of plants. However, the units can also be manufactured from a wide variety of other materials such as Polythene (Registered Trade Mark) polypropylene, bakelite or other thermoplastic or thermo-setting synthetic resins, natural or synthetic rubber, concrete, metal or clay.

The units may be produced in a variety of sizes and shapes.

The modified construction shown in FIGS. 6 and 7 is similar to that already described with reference to FIGS. 1 to 5 except that the units A' have three limbs or points 12' instead of four and the pockets 10' are generally oval instead of being circular in plan.

The unit A'' of FIGS. 10 and 11 also is similar to those described with reference to FIGS. 1 to 5 but in this instance the central hole 20 thereof is generally square in shape as opposed to being circular.

Further, the bottom of each pocket 10 is provided with a central drain hole 21 and the upwardly extending tube 22 defining the hole 20 has a tapering and sloping part 23 leading each pocket 10. The lower inboard wall parts 24 of each pocket 10 are arranged so as to provide recesses which co-operate to form means whereby said units can be correctly located one on top of the other, and to lock together subjacent units, substantially as before described. It will also be noted that the rim of the tube 22 and the outer rim defining the pockets 10 are provided with peripheral stiffening flanges.

We claim:
1. A constructional plant pot unit comprising a constructional unit having a plurality of radially extending pots arranged around a central hole defined by an upwardly extending and tapering tube, said pot being defined by convexedly radiussed outer parts and corresponding intervening concavedly radiussed interconnected parts whereby a pot of one unit can be mated with a concave part of a laterally adjacent similar unit, said unit having a base connecting said pots to said tube and each of said pots with recesses provided therein and adjacent said base with said recesses being arranged so as to seat upon the concave parts of a subjacent similar unit whereby at least a column of vertically aligned units may be built with each unit angularly off-set relative to subjacent or/and superjacent units and with laterally adjacent units of adjacent columns connected.

2. A constructional plant pot unit as claimed in claim 1, wherein drainage holes are provided in each pot at a point where said tapered tube defining said central hole joins said base of said unit.

3. A constructional plant pot as claimed in claim 2, wherein cut-outs are provided in said base of said unit which cut-outs function to provide a circulation of air to growing media when filled within said central hole defined by said tapered tube.

4. A structure as claimed in claim 3 further comprising at least one additional plant pot unit, said units being arranged in the form of a column with each unit off-set angularly relative to subjacent or/and superjacent units whereby each pot is located in vertical alignment with a concave part of a subjacent or/and superjacent unit.

5. A structure comprising a plurality of columns of plant pot units as claimed in claim 4, said columns being arranged in the form of a wall with pots of each column of said units mating with concave parts of units of an adjacent column of said units and being connected by said grooves formed in said bases of said units.

6. A structure, as claimed in claim 4, including reinforcing means inserted through the vertically aligned central holes of said plant pot units, each said reinforcing means consisting of an apertured tube thereby to facilitate irrigation of growing media when filled into the pots of said units.

* * * * *